US010550935B2

(12) United States Patent
Yuan

(10) Patent No.: US 10,550,935 B2
(45) Date of Patent: Feb. 4, 2020

(54) HYDRAULIC MECHANICAL TRANSMISSION

(71) Applicant: Eaton Intelligent Power Limited, Dublin (IE)

(72) Inventor: QingHui Yuan, Edina, MN (US)

(73) Assignee: Eaton Intelligent Power Limited, Dublin (IE)

(*) Notice: Subject to any disclaimer, the term of this patent is extended or adjusted under 35 U.S.C. 154(b) by 54 days.

(21) Appl. No.: 15/680,957

(22) Filed: Aug. 18, 2017

(65) Prior Publication Data
US 2018/0051784 A1 Feb. 22, 2018

Related U.S. Application Data

(60) Provisional application No. 62/377,151, filed on Aug. 19, 2016, provisional application No. 62/377,164, filed on Aug. 19, 2016, provisional application No. 62/377,178, filed on Aug. 19, 2016.

(51) Int. Cl.
*F16H 39/10* (2006.01)
*F16H 61/00* (2006.01)
*F16H 61/438* (2010.01)
*F16H 47/04* (2006.01)
(Continued)

(52) U.S. Cl.
CPC ........... *F16H 61/438* (2013.01); *F16H 39/10* (2013.01); *F16H 47/04* (2013.01); *F16H 47/07* (2013.01); *F16H 61/0009* (2013.01); *F16H 61/0025* (2013.01); *F16H 2037/0866* (2013.01); *F16H 2039/105* (2013.01); *F16H 2047/045* (2013.01)

(58) Field of Classification Search
CPC .............. F16H 61/438; F16H 61/0009; F16H 61/0025; F16H 39/10; F16H 39/12; F16H 47/02; F16H 47/04; F16H 47/07
USPC .......................................................... 60/492
See application file for complete search history.

(56) References Cited

U.S. PATENT DOCUMENTS 3,074,296 A * 1/1963 Heinrich ................. F16H 47/04
475/75
3,241,319 A * 3/1966 Andrews ................ B60K 17/10
60/435
(Continued)

FOREIGN PATENT DOCUMENTS

WO 2017031379 A1 2/2017

OTHER PUBLICATIONS

A41CT Compact Unit for Hydromechanical Power Split Gearboxes, Youtube, Mar. 7, 2012, https://www.youtube.com/watch?v=T5vpql7Smlc (2012).

Primary Examiner — Nathaniel E Wiehe
Assistant Examiner — Richard C Drake
(74) Attorney, Agent, or Firm — Merchant & Gould P.C.

(57) ABSTRACT

A hydraulic mechanical transmission includes a first hydraulic unit having a first shaft and a second hydraulic unit having a second shaft. The second hydraulic unit is connected in hydraulic fluid communication with the first hydraulic unit by high and low pressure lines. At least one of the first and second hydraulic units has variable displacement. A mechanical torque transfer arrangement transfers torque between the first shaft and the rotatable component of the second hydraulic unit. One of the first and second hydraulic units operates as a hydraulic pump and the other of the first and second hydraulic units operates as a hydraulic motor.

25 Claims, 9 Drawing Sheets

(51) Int. Cl.
*F16H 47/07* (2006.01)
*F16H 37/08* (2006.01)

(56) References Cited

U.S. PATENT DOCUMENTS

| | | | | |
|---|---|---|---|---|
| 3,300,000 | A * | 1/1967 | Stoyke | F16H 47/04 |
| | | | | 400/176 |
| 3,543,514 | A | 12/1970 | Reimer | |
| 3,643,433 | A * | 2/1972 | Widmaier | F04B 1/146 |
| | | | | 417/236 |
| 4,875,390 | A | 10/1989 | Hayashi et al. | |
| 5,054,289 | A * | 10/1991 | Nagatomo | F16H 39/14 |
| | | | | 60/468 |
| 5,396,768 | A | 3/1995 | Zulu | |
| 5,423,183 | A * | 6/1995 | Folsom | F04C 14/20 |
| | | | | 60/413 |
| 5,486,142 | A * | 1/1996 | Folsom | F16H 39/10 |
| | | | | 474/69 |
| 6,773,368 | B1 * | 8/2004 | Williames | B60K 17/16 |
| | | | | 475/74 |
| 7,347,047 | B1 * | 3/2008 | Hauser | B60K 17/105 |
| | | | | 60/484 |
| 10,227,964 | B2 * | 3/2019 | Graf | F04B 1/188 |
| 2004/0163490 | A1 | 8/2004 | Nakatani et al. | |
| 2005/0106958 | A1 * | 5/2005 | Ohtsuki | B63H 23/26 |
| | | | | 440/86 |
| 2006/0120884 | A1 * | 6/2006 | Nozaki | F16H 39/14 |
| | | | | 417/269 |
| 2008/0152517 | A1 * | 6/2008 | Ishii | A01D 69/02 |
| | | | | 417/423.5 |
| 2010/0107626 | A1 * | 5/2010 | Nelson | F16H 39/14 |
| | | | | 60/491 |
| 2010/0205951 | A1 * | 8/2010 | Leker | F16H 39/14 |
| | | | | 60/445 |
| 2013/0269328 | A1 | 10/2013 | Iwaki et al. | |
| 2014/0009126 | A1 * | 1/2014 | Vanderzyden | F16H 39/12 |
| | | | | 322/40 |
| 2014/0096515 | A1 * | 4/2014 | Mochizuki | F16H 57/0471 |
| | | | | 60/492 |
| 2015/0267721 | A1 * | 9/2015 | Yasuda | B60K 17/105 |
| | | | | 60/487 |
| 2018/0051799 | A1 | 2/2018 | Yuan | |
| 2018/0051803 | A1 | 2/2018 | Yuan et al. | |

* cited by examiner

HYDRAULIC MECHANICAL TRANSMISSION

CROSS-REFERENCE TO RELATED APPLICATIONS

This application claims priority to and the benefit of U.S. Provisional Patent Application No. 62/377,151, filed Aug. 19, 2016, entitled "Hydraulic Mechanical Transmission with Increased Efficiency"; U.S. Provisional Patent Application No. 62/377,164, filed Aug. 19, 2016, entitled "Hydraulic Mechanical Transmission with Torque Boost"; and U.S. Provisional Patent Application No. 62/377,178, filed Aug. 19, 2016, entitled "Hydraulic Mechanical Transmission"; the disclosures of which are hereby incorporated by reference herein in their entirety.

TECHNICAL FIELD

The present disclosure relates generally to transmissions. More particularly, the present disclosure relates to hydraulic mechanical transmissions.

BACKGROUND

Hydraulic mechanical transmissions (HMT), also referred to as hydro-mechanical transmissions, can be used to supply or transfer mechanical power. More conventional examples of hydraulic mechanical transmissions implement the use of planetary gear sets. However, such hydraulic mechanical transmissions are typically large in size and expensive to build, which generally limits their use to large horsepower machines.

SUMMARY

Aspects of the present disclosure relate to a hydraulic mechanical transmission that is compact and relatively low cost so as to be suited for lower horsepower off-road machines, tractors, and utility vehicles.

Another aspect of the present disclosure relates to a hydraulic mechanical transmission that can practically be used for applications having horsepower ranges below 100 horsepower.

Another aspect of the present disclosure relates to a hydraulic mechanical transmission that does not include a planetary gear set.

Another aspect of the present disclosure relates to a hydraulic mechanical transmission that can be configured in a U-shaped architecture, a Z-shaped architecture, or an in-line architecture.

Still another aspect of the present disclosure relates to a hydraulic mechanical transmission having relatively high efficiency and the ability to operate with only one gear range while still providing enough power across the full range. Such an architecture can enable shifting on the fly without the need to stop the vehicle and shift the gear range.

A further aspect of the present disclosure relates to a hydraulic mechanical transmission that can utilize modular parts, components and units to reduce cost and readily allow for different configurations (e.g., Z-type configurations, U-type configurations or in-line type configurations) to be designed/implemented to meet customer requirements. Modularity can provide more flexible or adaptable configuration options.

Another aspect of the present disclosure relates to a hydraulic mechanical transmission that includes a first hydraulic unit having a first shaft, and a second hydraulic unit connected in hydraulic fluid communication with the first hydraulic unit by high and low pressure lines. The second hydraulic unit includes a second shaft and a rotating group that is coupled to the second shaft so as to rotate in unison with the second shaft about an axis defined by the second shaft. The rotating group includes a cylinder block that defines a plurality of axial cylinders. The rotating group also includes pistons mounted to slide within the axial cylinders. The second hydraulic unit further includes a rotatable component that is rotatable relative to the second shaft about the axis of the second shaft. The rotatable component includes a swashplate that opposes ends of the pistons. The rotatable component also includes a commutation structure for providing fluid communication between the high and low pressure lines and the axial cylinders of the rotating group while maintaining separation between the high and low pressure lines. At least one of the first and second hydraulic units has variable displacement. A mechanical torque transfer arrangement transfers torque between the first shaft and the rotatable component of the second hydraulic unit. In use, one of the first and second hydraulic units operates as a hydraulic pump and the other of the first and second hydraulic units operates as a hydraulic motor. In one example, the first hydraulic unit is a hydraulic pump.

In one example, the pistons reciprocate within the cylinders as the relative rotation occurs between the rotatable component and the rotating group about the axis of the second shaft. An angle of the swashplate relative to the axis of the second shaft determines a stroke length the pistons reciprocate within the cylinders as relative rotation occurs between the rotatable component and the rotating group about the axis of the second shaft. In one example, the angle of the swashplate is fixed relative to the axis of the second shaft such that the second hydraulic unit has fixed displacement, and the first hydraulic unit has variable displacement. In one example, the ends of the pistons include shoes that travel along an arcuate path around the swashplate as relative rotation occurs between the rotatable component and the rotating group about the axis of the second shaft.

In one example, the commutation structure maintains fluid communication between the high pressure line and the rotating group regardless of a rotational position of the rotatable component about the axis defined by the second shaft. The commutation structure also maintains fluid communication between the low pressure line and the rotating group regardless of a rotational position of the rotatable component about the axis defined by the second shaft. The commutation structure is adapted to rotate in unison with the swashplate relative to the second shaft such that in operation a rotational position of the commutation structure about the axis of the second shaft does not change relative to the swashplate.

In one example, the commutation structure includes a first annular groove in fluid communication with the high pressure line and a second annular groove in fluid communication with the low pressure line. The commutation structure includes first porting in fluid communication with the first annular groove and second porting in fluid communication with the second annular groove. The first porting includes a first fluid exchange interface in fluid communication with a first plurality of the cylinders of the rotating group as the rotating group rotates relative to the commutation structure. The second porting includes a second fluid exchange interface in fluid communication with a second plurality of the cylinders of the rotating group as the rotating group rotates relative to the commutation structure. The first fluid exchange interface is fixed in rotational alignment with a first portion of the arcuate path around the swashplate, and the second fluid exchange interface is fixed in rotational alignment with a second portion of the arcuate path around the swashplate. In one example, a first portion of the arcuate path around the swashplate corresponds to an extension stoke of the pistons within the cylinder and the second portion of the arcuate path corresponds to a retraction stroke of the pistons within the cylinders.

In one example, the first and second fluid exchange interfaces each include a generally semi-circular slot. In another example, the first and second annular grooves have open sides that face in an axial direction relative to the axis to the second shaft. In another example, the first and second annular grooves have open sides that face in a radial direction relative to the axis to the second shaft.

In one example, one or more bearings 45 are between the rotatable component and the second shaft for allowing relative rotation between the rotatable component and the second shaft about the axis of the second shaft. In one example, the second hydraulic unit includes a housing, and one or more bearings are provided between the rotatable component and the housing for allowing relative rotation between the housing and the rotatable component, and one or more bearings are provided between the haft and the housing.

In one example, the first hydraulic unit includes a rotating group coupled to the first shaft so as to rotate in unison with the first shaft. The rotating group includes a cylinder block defining a plurality of cylinders and pistons adapted to slide in the cylinders. The first hydraulic unit further includes a swashplate upon which shoes of the pistons ride. The swashplate is capable of being angled with respect to an axis of the first shaft with an angle of the swashplate determining a stroke length of the pistons within the cylinders. The angle of the swashplate is variable to vary the stroke length of the pistons and thus the displacement of the first hydraulic unit.

In one example, when in use, the first hydraulic unit is the hydraulic pump and the second hydraulic unit is the hydraulic motor, and the hydraulic motor has a fixed displacement. In one example, the first shaft is coupled to an engine and the second shaft is coupled to a drive train for transferring torque to a driven axle.

In one example, the swashplate of the hydraulic pump can be set at a neutral orientation perpendicular to the axis of the first shaft such that the hydraulic pump has zero displacement. When the hydraulic pump has zero displacement, the first and second shafts are locked with all power transferred from the hydraulic pump to the hydraulic motor being mechanical power through the mechanical torque transfer arrangement, and the second shaft has a locked rotational speed when the first and second shafts are locked.

In one example, the swashplate can be pivoted in a positive direction from the neutral orientation to a forward angled position in which hydraulic fluid flow from the first hydraulic unit transfers hydraulic power from the first hydraulic unit to the second hydraulic unit which increases the rotational speed of the second shaft as compared to the locked rotational speed.

In another example, the swashplate can be pivoted in a negative direction from the neutral orientation to a reverse angled position in which hydraulic fluid flow from the first hydraulic unit transfers hydraulic power from the first hydraulic unit to the second hydraulic unit which decreases the rotational speed of the second shaft as compared to the locked rotational speed.

In one example, the high and low pressure lines reverse when the swashplates moves between the forward and reverse angled positions.

In one example, the mechanical torque transfer arrangement includes a component selected from the group consisting of a belt, a chain, a pulley and a gear. In one example, the mechanical torque transfer arrangement includes a gear arrangement including intermeshing gears. In one example, the gear arrangement includes only two intermeshing gears one corresponding to each of the first and second shafts. In another example, the gear arrangement includes more than two gears.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DETAILED DESCRIPTION

Figure 1:
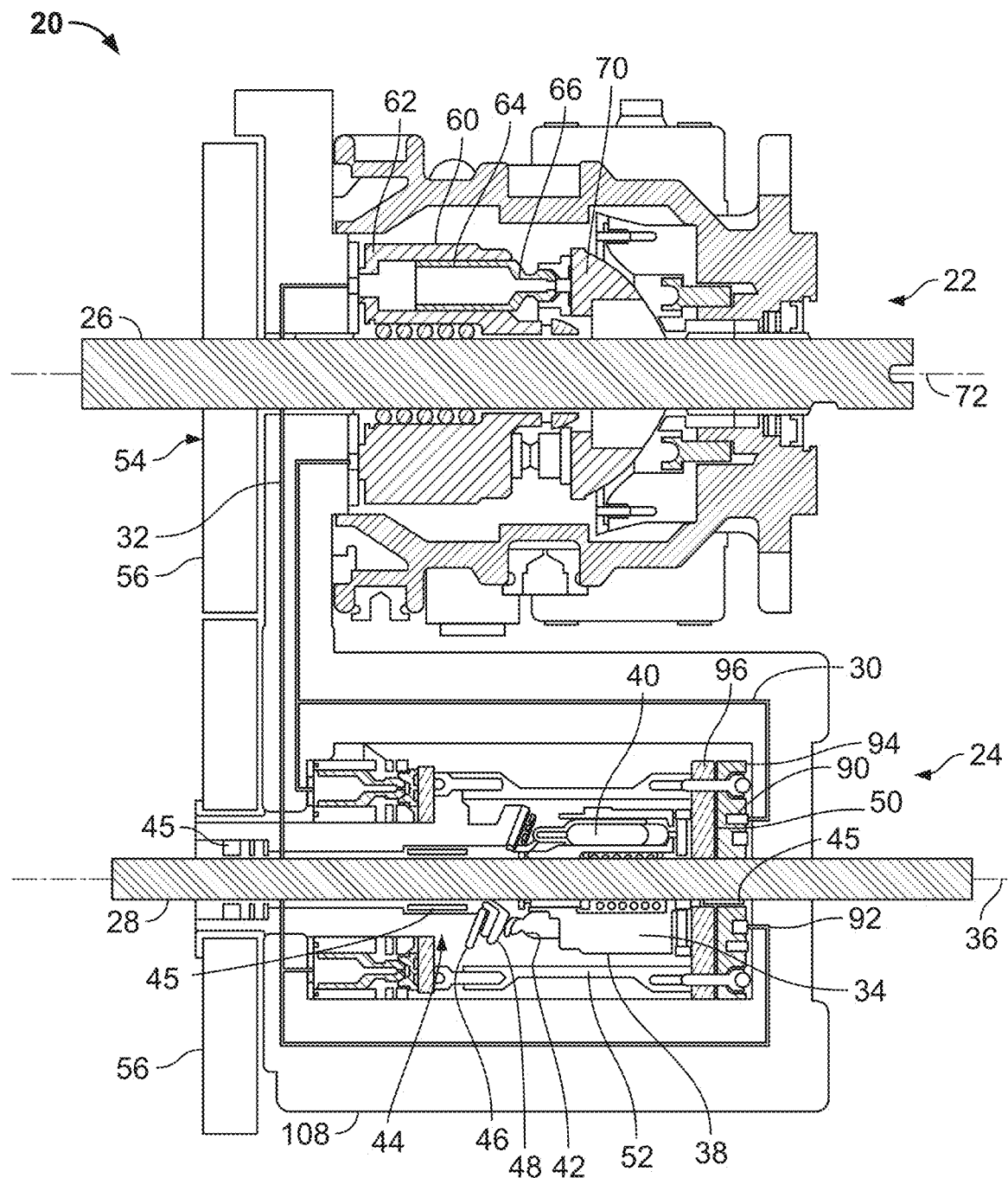
FIG. 1 is a cross-sectional view of a hydraulic mechanical transmission in accordance with the principles of the present disclosure, the transmission is shown having a U-shaped configuration and first and second hydraulic units.

FIG. 1 illustrates a hydraulic mechanical transmission 20 in accordance with the principles of the present disclosure. The hydraulic mechanical transmission 20 includes a first hydraulic unit 22 and a second hydraulic unit 24. The first hydraulic unit 22 includes a first shaft 26 and the second hydraulic unit includes a second shaft 28. The first and second hydraulic units 22, 24 are connected in hydraulic fluid communication with one another by high and low pressure lines 30, 32. As used herein, the term "pressure line" includes any passage, tube, hose, conduit, port, porting, passage in a housing or other structure for carrying hydraulic fluid. Also, the terms "high pressure" and "low pressure" are intended to be relative terms simply meaning that one pressure line has higher pressure than the other.

The second hydraulic unit 24 includes a rotating group 34 that is coupled to the second shaft 28 so as to rotate in unison with the second shaft 28 about an axis 36 defined by the second shaft 28. The rotating group 34 includes a cylinder block 38 that defines a plurality of axial cylinders 40. The cylinder block 38 is connected to the second shaft 28 by a torque-transmitting connection such as a splined or keyed connection such that the cylinder block 38 as well as the remainder of the rotating group 34 rotates in unison with the second shaft 28. The rotating group 34 also includes pistons 42 mounted to slide or reciprocate within the axial cylinders 40.

The second hydraulic unit 24 further includes a rotatable component 44 including a swashplate 46 that opposes the ends of the pistons 42. The ends of the pistons 42 can include shoes 48 (shown in more detail in FIG. 6) that ride along the swashplate 46. Hydrostatic bearings can be defined between the shoes 48 and the surface of the swashplate 46. The rotatable component 44 also includes a commutation structure 50 (shown in more detail in FIGS. 2-5) for providing fluid communication between the high and low pressure lines 30, 32 and the axial cylinders 40 of the rotating group 34 while maintaining separation between the high and low pressure lines 30, 32. It will be appreciated that the commutation structure 50 can be mechanically coupled to the swashplate 46 by a coupling structure 52 such as a sleeve, rods, couplers, a housing, struts, or other structures. In this way, the commutation structure 50 is configured to rotate in unison with the swashplate 46. In certain examples, the commutation structure 50 can include porting having fluid exchange interfaces that are fixed in rotational position relative to the swashplate 46.

The hydraulic mechanical transmission 20 further includes a mechanical torque transfer arrangement 54 for transferring torque between the first shaft 26 of the first hydraulic unit 22 and the rotatable component 44 of the second hydraulic unit 24. As depicted, the mechanical torque transfer arrangement 54 includes two intermeshing gears 56 each coupled to one of the shafts 26, 28. In other examples, more than two gears can be utilized. Additionally, in further examples, other mechanical torque transfer arrangements such as chains, belts, pulleys and other types of gears or gear configurations can be used.

In certain examples, at least one of the first and second hydraulic units 22, 24 is configured to provide a variable displacement which can be controlled by a controller such as an electronic controller. In use of the hydraulic mechanical transmission 20, one of the first and second hydraulic units 22, 24 operates as a hydraulic pump and the other of the first and second hydraulic units 22, 24 operates as a hydraulic motor.

Referring still to FIG. 1, the first hydraulic unit 22 includes a rotating group 60 coupled to the first shaft 26 so as to rotate in unison with the first shaft 26. The rotating group 60 includes a cylinder block 62 defining a plurality of axial cylinders 64. The cylinder block 62 is mechanically coupled to the first shaft 26 by a mechanical connection that rotationally fixes the cylinder block 62 to the first shaft 26 such that the cylinder block 62 and the remainder of the rotating group 60 rotate in unison with the first shaft 26. In certain examples, a mechanical connection such as a splined connection, a keyed connection, a fastened connection or other connection can be used. The rotating group 60 further includes pistons 66 adapted to slide or reciprocate in the axial cylinders 64. The pistons 66 can include piston shoes 68. The first hydraulic unit 22 further includes a swashplate 70 upon which the shoes 68 of the pistons 66 ride. Hydrostatic bearings can be provided between the piston shoes 68 and the surface of the swashplate 70.

It will be appreciated that in a rotating group such as the type disclosed herein, the axial pistons are adapted to reciprocate within their corresponding cylinders as relative rotation occurs between the swashplate and the rotating group. An angle of the swashplate relative to the axis of the shaft determines a stroke length that the pistons reciprocate within their corresponding cylinders as relative rotation occurs between the swashplate and the rotating group.

With regard to the second hydraulic unit 24, the pistons 42 reciprocate within their respective cylinders 40 as relative rotation occurs between the rotatable component 44 and the rotating group 34 about the axis 36 of the second shaft 28. The angle of the swashplate 46 determines the stroke length that the pistons 42 reciprocate within their corresponding cylinders 40. With regard to the second hydraulic unit 24, the swashplate 46 has a fixed angle relative to the axis 36. Thus, the second hydraulic unit 24 has a fixed displacement since the angle of the swashplate 46 cannot be adjusted to adjust the stroke length of the pistons 42.

In contrast, the swashplate 70 of the first hydraulic unit 22 can be positioned at different angles relative to the first shaft 26 so as to adjust the displacement of the first hydraulic unit 22. When the swashplate 70 is set at a neutral position that is generally perpendicular relative to an axis 72 of the first shaft 26, the first hydraulic unit 22 generally has zero displacement. The swashplate 70 can be pivoted in a forward direction (e.g., clockwise as shown at FIG. 1) from the neutral pivot orientation to a forward angled position such that the piston stroke length and thus the displacement of the first hydraulic unit 22 increases. The more forward the swashplate 70 is pivoted, the greater displacement of the pistons 66. The swashplate 70 can also be pivoted in a negative direction from the neutral orientation (e.g., counter-clockwise as shown at FIG. 1) to a reverse angled position. When the swashplate 70 is pivoted between the forward and reverse angled positions, the high and low pressure lines 30, 32 reverse. Thus, when the swashplate 70 is in the reverse angled position, the pressure line 30 becomes the low pressure line and the pressure line 32 becomes the high pressure line. The more that swashplate 70 is pivoted in the negative direction the greater the piston stroke length and thus the greater the displacement of the first hydraulic unit 22.

For a rotating group of the type described herein, when relative rotation occurs between the rotating group and its corresponding swashplate, the shoes of the pistons travel or ride along an arcuate path around the swashplate as the relative rotation occurs. For generally half of the arcuate path around the swashplate, the pistons extend along an extension stroke. Along the remaining half of the arcuate path around the swashplate, the pistons retract along a retraction stroke. It will be appreciated that the arcuate path corresponding to the extension stroke extends generally from a point of the swashplate closest to the rotating group to a point of the swashplate farthest from the rotating group. Also, the part of the arcuate path point corresponding to the retraction stroke extends from the part of the swashplate farthest from the rotating group to the part of the swashplate closest to the rotating group.

Figure 6:
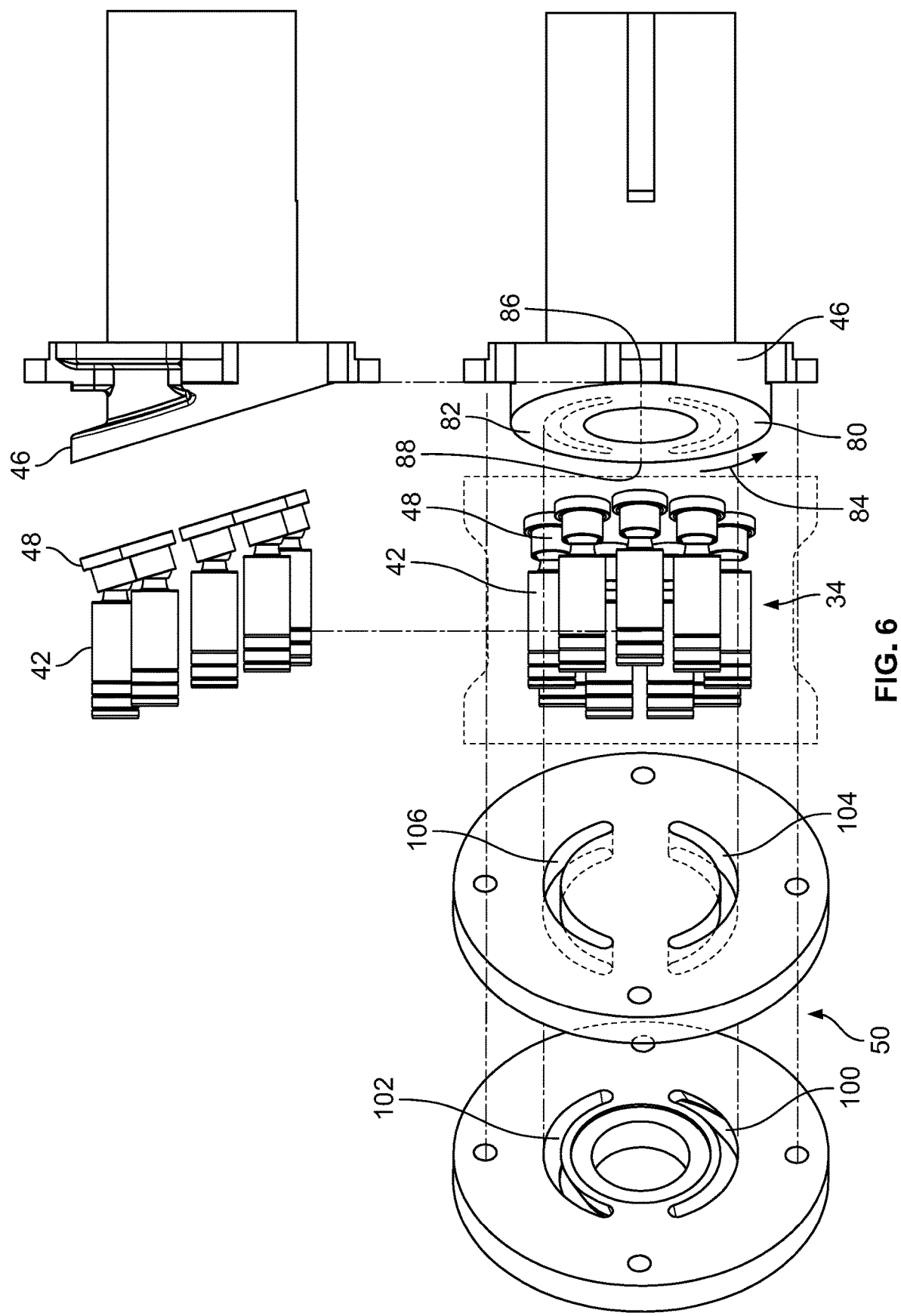
FIG. 6 is a diagrammatic view showing how the commutation structure of the hydro-mechanical transmission of FIG. 1 is rotationally oriented relative to a swashplate of the second hydraulic unit of FIG. 1; inlet and outlet ports (i.e., fluid exchange interfaces) of the commutation structure have been superimposed on the piston supporting surface of the swashplate to schematically show the relative positioning of the inlet and outlet porting relative to the swashplate.

FIG. 6 is a diagrammatic view of the second hydraulic unit showing a top view (at the top of the figure) of the swashplate 46 orientated with respect to the pistons 42 of the rotating group 34, and a side view (at the bottom of the figure) of the swashplate 46 orientated with respect to the pistons 42 of the rotating group 34 and the commutation structure 50. As shown at FIG. 6, the swashplate 46 includes a first semicircle section 80 and a second semicircle section 82. Assuming the rotating group 34 rotates in a direction 84 relative to the swashplate 46, section 80 of the swashplate 46 corresponds to an extension stroke of the pistons 42 and section 82 corresponds to a retraction stroke of the pistons 42. Point 86 of the swashplate 46 is farthest from the rotating group 34 and point 88 of the swashplate is closest to the rotating group 34.

The commutation structure 50 of the second hydraulic unit 24 maintains constant fluid communication between the high pressure line 30 and the rotating group 34 regardless of a rotational position of the rotatable component 44 about the axis 36 of the second shaft 28. The commutation structure 50 also maintains fluid communication between the low pressure line 32 and the rotating group 34 regardless of a rotational position of the rotatable component 44 about the axis 36 of the second shaft 28. The commutation structure 50 is adapted to rotate in unison with the swashplate 46 relative to the second shaft 28 such that in operation a rotational position of the commutation structure 50 about the axis 36 of the second shaft 28 does not change relative to the swashplate 46. As shown at FIG. 1, the commutation structure 50 can include a first annular groove 90 in fluid communication with the high pressure line 30 and a second annular groove 92 in fluid communication with the low pressure line 32. Since the grooves 90, 92 are annular (as shown in more detail in FIG. 3) and are centered about the axis 36, the annular grooves 90, 92 maintain in constant communication with their respective pressure lines 30, 32 regardless of the rotational position of the rotatable component 44 about the axis 36. It will be appreciated that the annular grooves 90, 92 have open sides that face in an axial direction relative to the axis 36 of the second shaft 28 (as will be described in more detail with regard to FIGS. 2-5).

Figure 2:
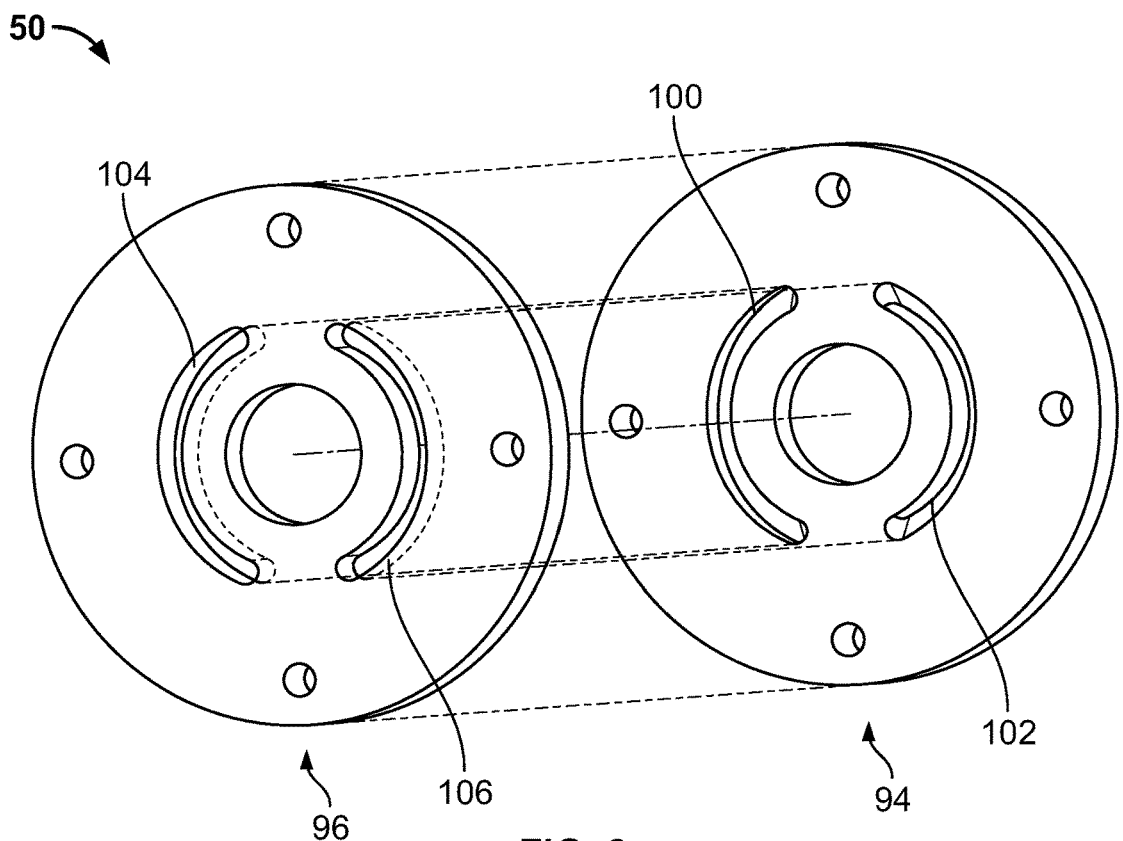
FIG. 2 is an exploded view of an example commutation structure that can be utilized by the hydraulic mechanical transmission of FIG. 1.
Figure 3:
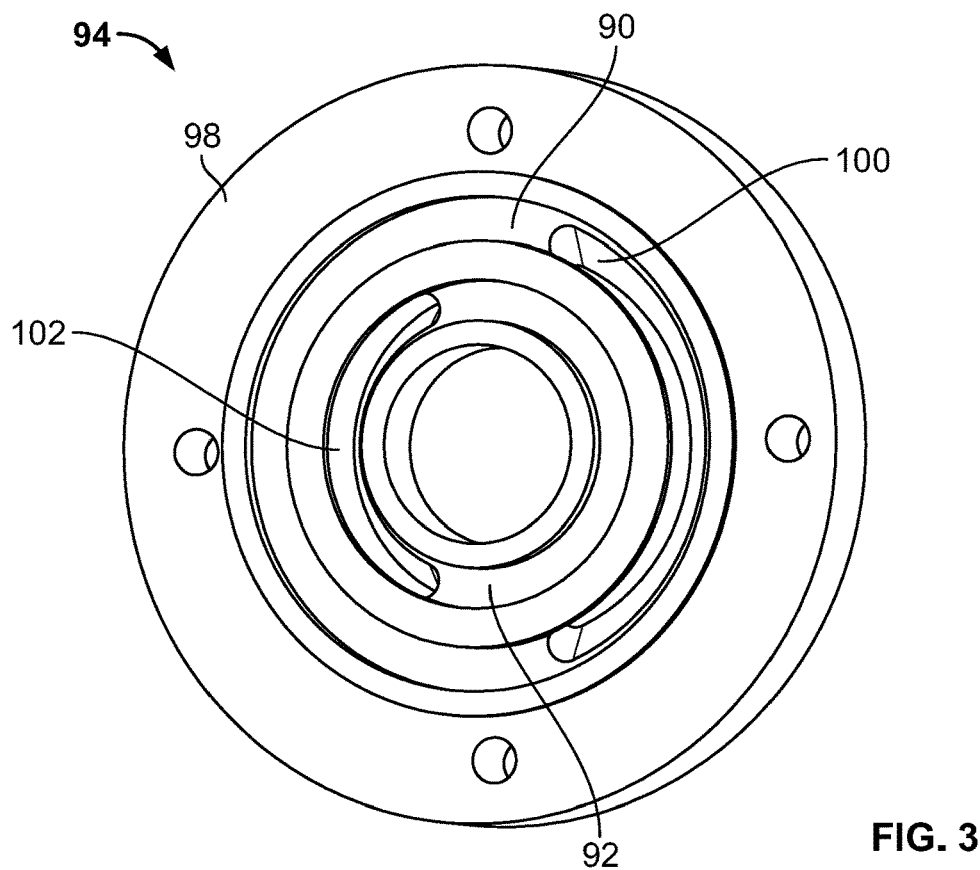
FIG. 3 shows a first side of a first valve plate of the commutation structure of FIG. 2.
Figure 4:
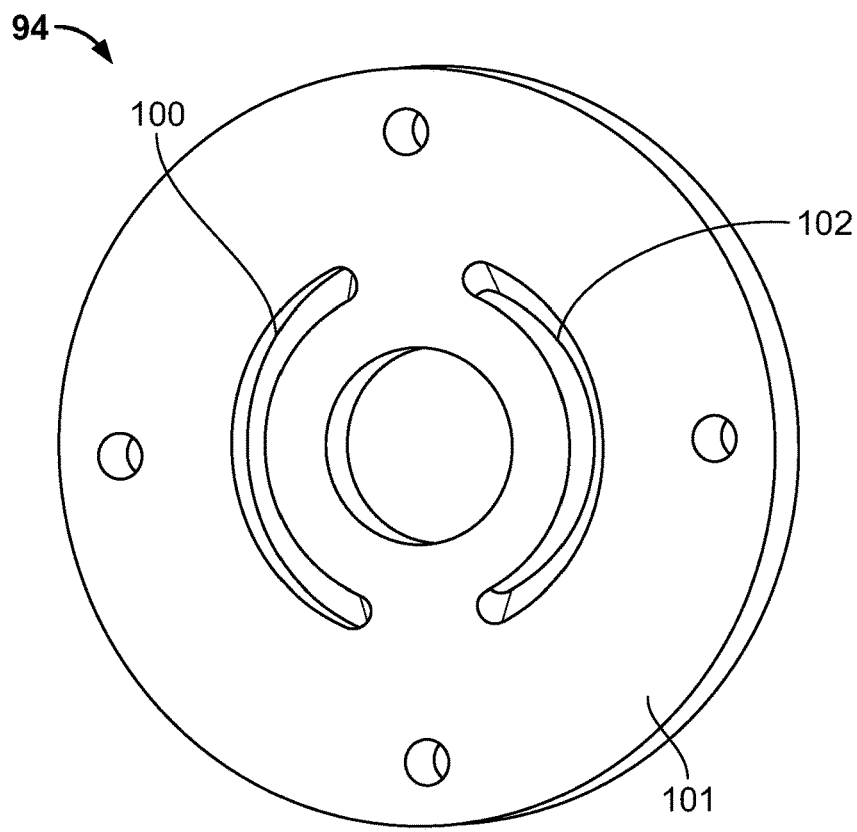
FIG. 4 shows a second, opposite side of the valve plate of FIG. 3.
Figure 5:
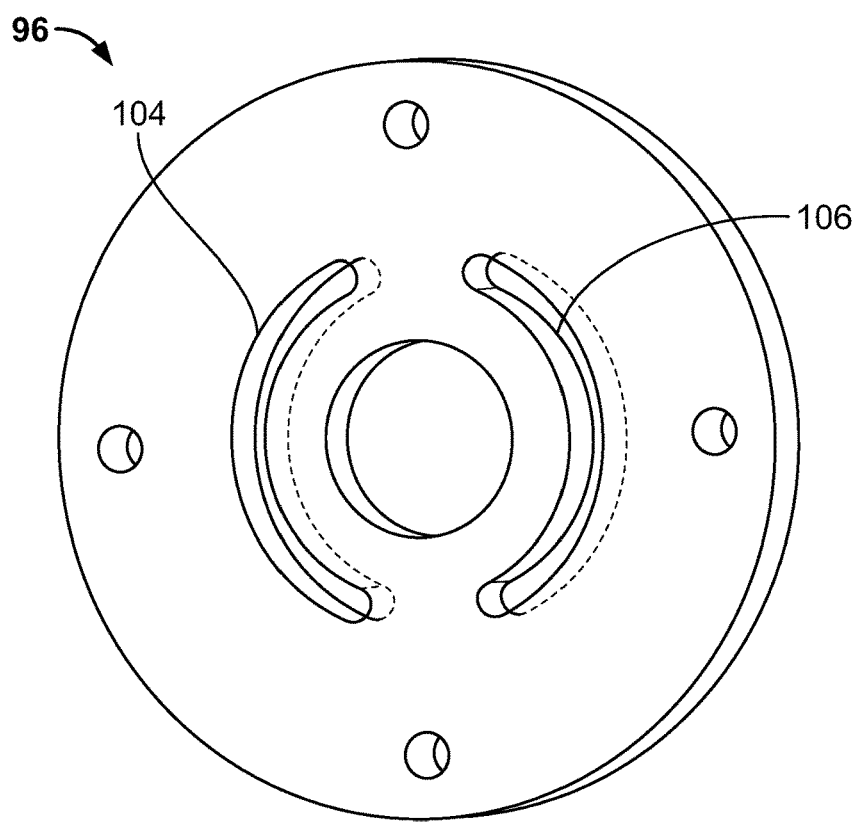
FIG. 5 shows a second valve plate of the commutation structure of the hydraulic mechanical transmission of FIG. 1.

FIGS. 2-5 schematically show the commutation structure 50. In certain examples, the commutation structure 50 can include one or more valve plates, or other structures. As shown at FIGS. 1 and 2, the commutation structure 50 includes two plates 94, 96. Plate 94 includes a first side 98 (see FIG. 3) in which the annular grooves 90, 92 are defined. Passage 100 extends from the annular groove 90 to an opposite second side 101 (see FIG. 4) of the plate 94. Passage 102 extends from the annular groove 92 to the second side 101 of the plate 94. The passages 100, 102 respectively align with curved slots 104, 106 defined through the second plate 96 (see FIG. 5). It will be appreciated that terms such as slots, grooves, passages, and like terms can also be referred to as porting. It will also be appreciated that the slots 104, 106 can be referred to as fluid exchange interfaces since such structures function to exchange fluid between the commutation structure 50 and the rotating group 34.

As shown at FIG. 6, slot 104 is fixed in rotational alignment with the first semicircle section 80 of the swashplate 46 and the slot 106 is fixed in rotational alignment with the second semicircle section 82 of the swashplate 46. Thus, in the case where the second hydraulic unit 24 is a pump, slot 104 corresponds to the high pressure line 30 and inlets hydraulic fluid to the cylinders 40 of the rotating group 34, and slot 106 couples to the low pressure line 32 and outlets hydraulic fluid from the cylinders 40 of the rotating group 34. In operation, high pressure from the high pressure line 30 forces the pistons 42 to extend as the pistons 42 slide along the section 80 of the swashplate 46. In contrast, as the pistons 42 slide along the section 82 of the swashplate 46 the pistons 42 are forced to retract. The retraction of the pistons 42 causes fluid to be outputted through the slot 106 to the low pressure line 32.

Figure 7:
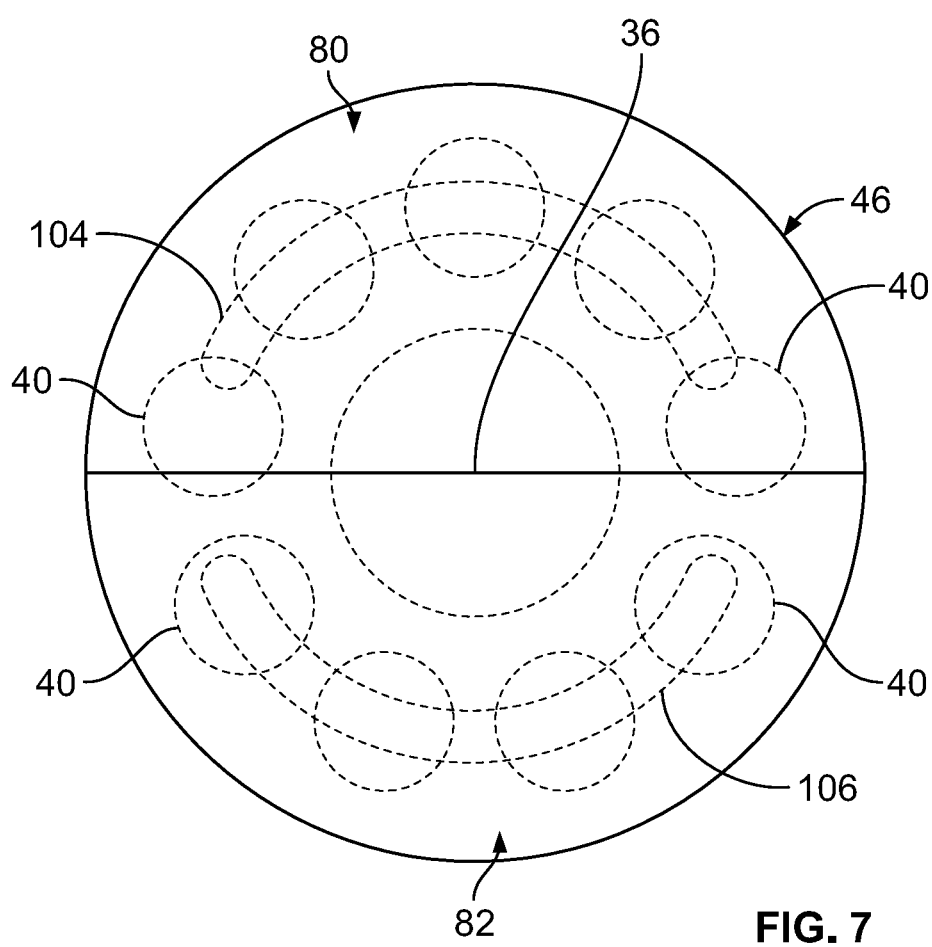
FIG. 7 is a diagrammatic view showing how the inlet and outlet porting of the commutation structure is positioned relative to cylinders of a rotating group of the hydro-mechanical transmission of FIG. 1 at a particular point in time; it will be appreciated that the positioning of the cylinders with respect to the inlet and outlet porting will vary over time as the relative rotation occurs between the rotating group and the commutation structure.

FIG. 7 diagrammatically shows positioning of the cylinders 40 relative to the slots 104, 106 of the commutation structure 50. At any given time, a first plurality of the axial cylinders 40 will be in fluid communication with slot 104 and a second plurality of cylinders 40 will be in fluid communication with the slot 106. As shown at FIG. 7, for illustration purposes, dash lines representing the positioning of the cylinders 40 and the slots 104, 106 have been superimposed on the surface of the swashplate 46. As relative rotation occurs between the rotatable component 44 and the rotating group 34, the cylinders 40 rotate relative to the commutation structure 50. Thus, each time the rotating group 34 makes one rotation relative to the commutation structure 50, each of the cylinders 40 is in in fluid communication with the slot 104 for about half the time and is in fluid communication with the slot 106 for about the remaining half of the time.

In certain examples, the rotatable component 44 is rotatable relative to the second shaft 28 and also relative to a housing 108 of the second hydraulic unit 24. One or more bearings can be provided between the second shaft 28 and the rotatable component 44. Additionally, bearings can be provided between the rotatable component 44 and the housing 108, and can also be provided between the shaft 28 and the housing 108. Some non-limiting examples of bearings that can be used include roller bearings, hydrostatic bearings, bushings, or other structures/types of bearings.

Figure 8:
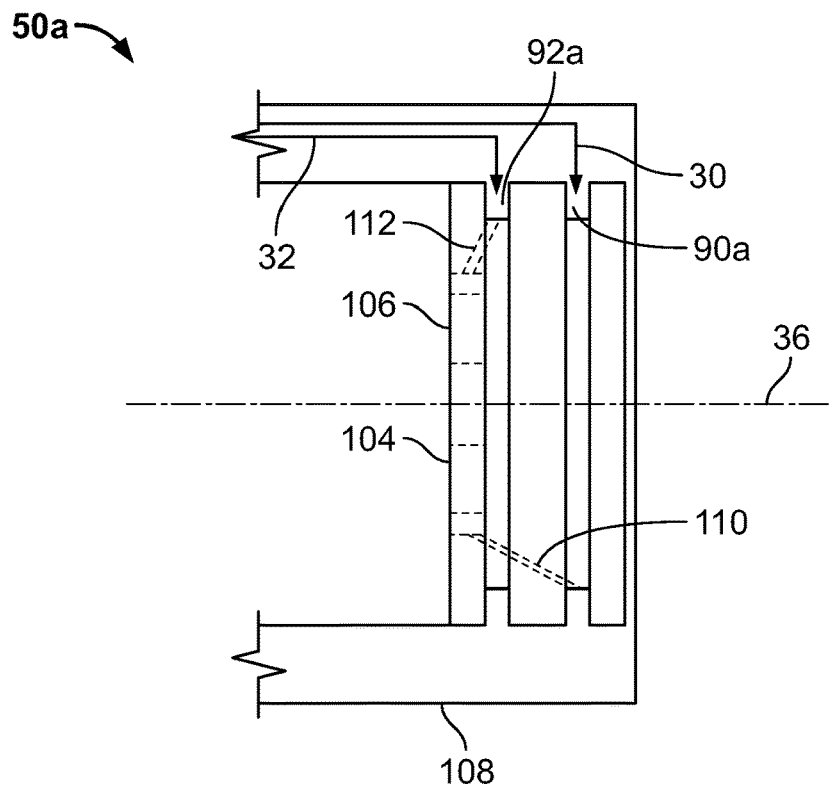
FIG. 8 is a side view of another commutation structure that can be used with the hydraulic mechanical transmission of FIG. 1.
Figure 9:
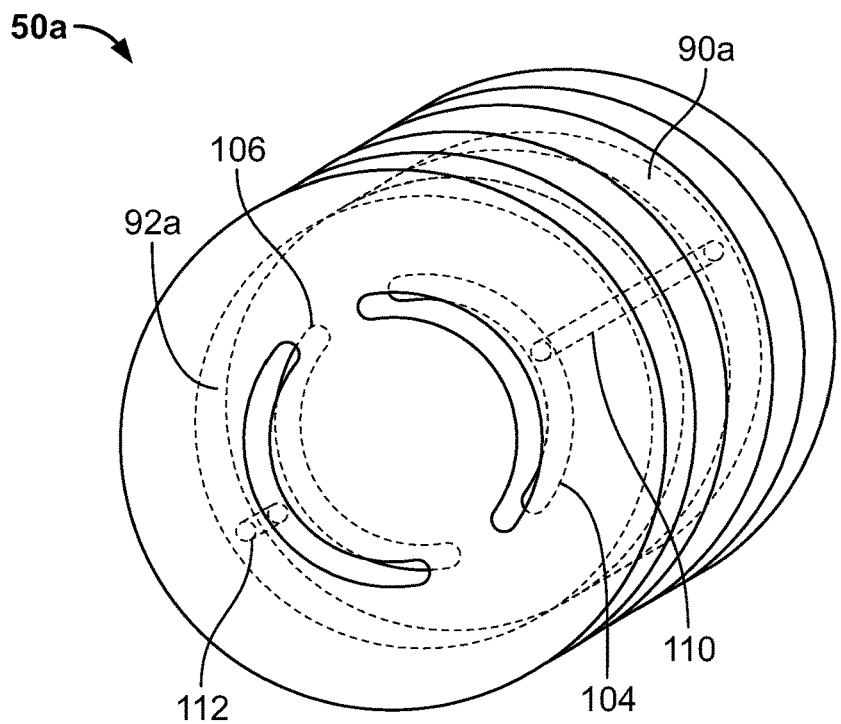
FIG. 9 is a perspective view of the commutation structure of FIG. 8.

FIGS. 8 and 9 show an alternative commutation structure 50a having annular grooves 90a, 92a having open sides that face radially outwardly from the axis 36. High and low pressure lines 30, 32 are shown defined through the housing and are in fluid communication with the groove 90a, 92a. Groove 90a is connected to slot 104 by port or ports 110 and groove 92a is connected to slot 106 by port or ports 112.

Figure 10:
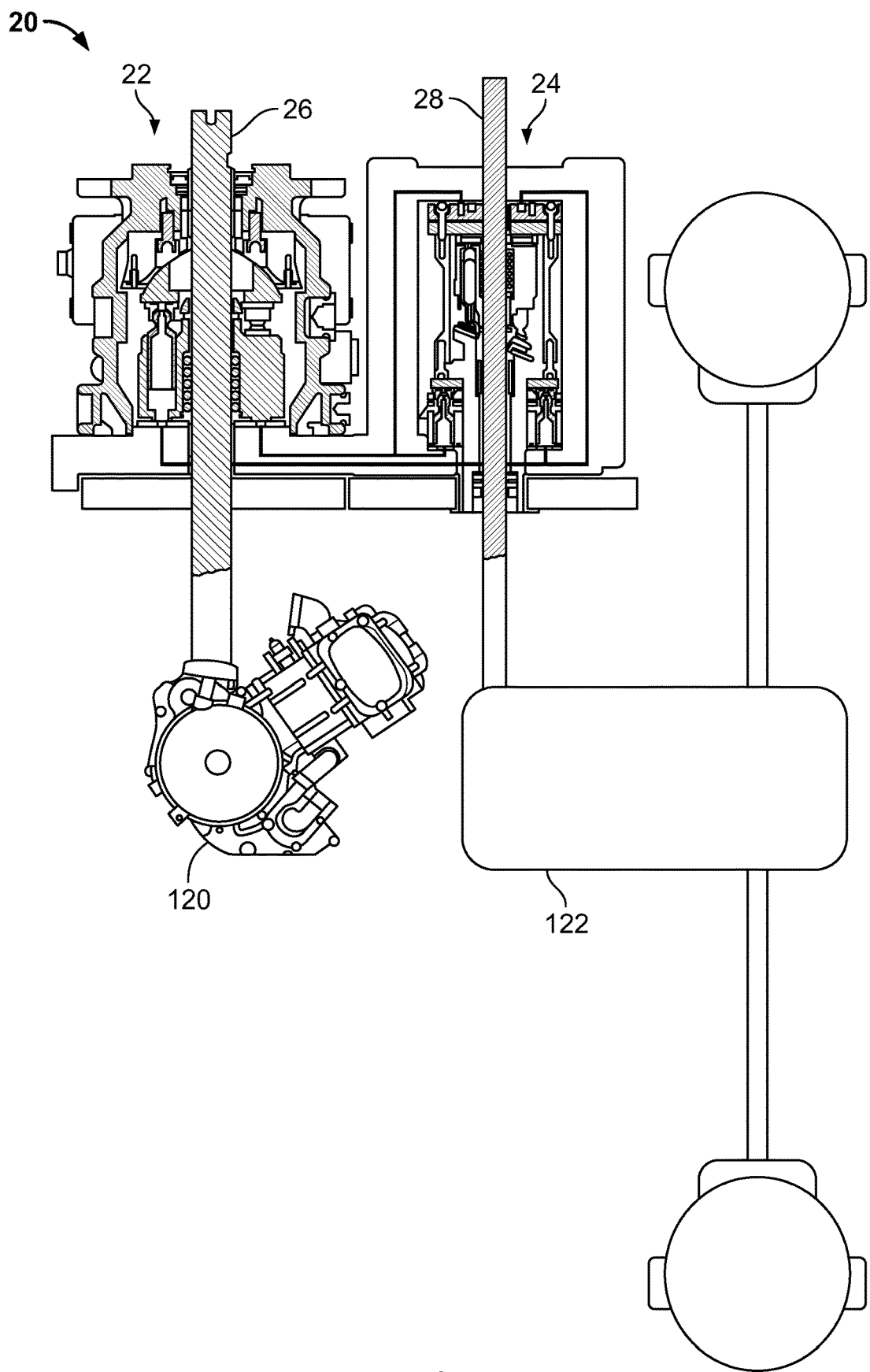
FIG. 10 shows a first configuration for coupling the hydraulic mechanical transmission of FIG. 1 to an engine and a drive train.
Figure 11:
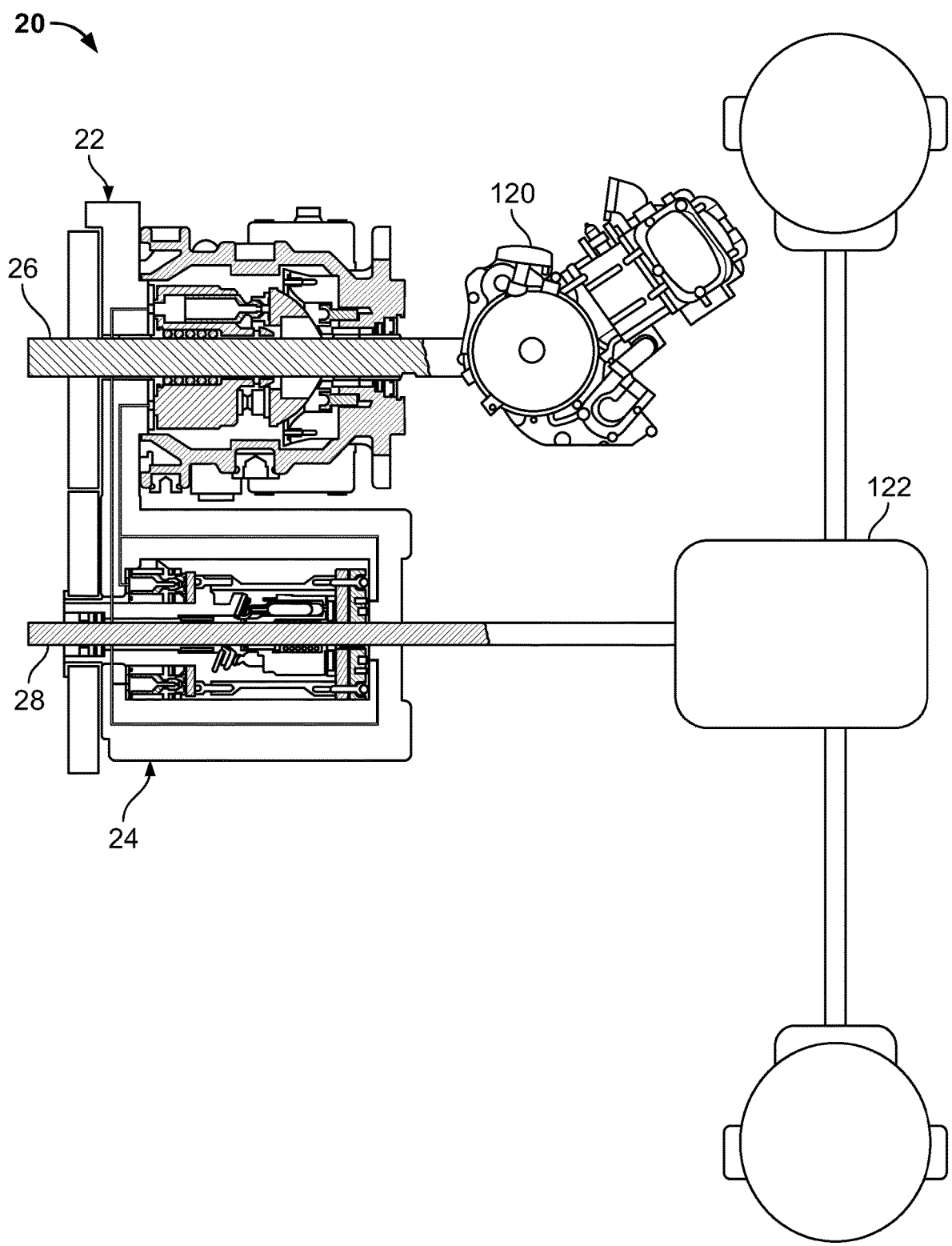
FIG. 11 shows another configuration for coupling the hydraulic mechanical transmission of FIG. 1 to an engine and a drive train.

In one example, the hydraulic mechanical transmission 20 can be used with the first hydraulic unit 22 operating as a hydraulic pump and the second hydraulic unit 24 operating as a hydraulic motor. For example, FIGS. 10 and 11 show the first shaft 26 of the first hydraulic unit 22 coupled to an engine 120 and the second shaft 28 of the second hydraulic unit 24 coupled to a drivetrain 122 for driving an axle or an axle assembly. In this way, the first shaft 26 functions as an input shaft for receiving torque and power from the engine 120 and the second shaft 28 functions as an output shaft for outputting torque and power to the drivetrain 122.

In the hydraulic mechanical transmission 20, mechanical power from the engine 120 is split into mechanical and hydraulic power at the first hydraulic unit 22. Mechanical power is transferred from the first hydraulic unit 22 to the rotatable component 44 of the second hydraulic unit 24 through the mechanical torque transfer arrangement 54. The rotatable component 44 transfers the mechanical power to the rotating group 34 of the second hydraulic unit 24 via the swashplate engagement. The rotating group 34 then transfers the mechanical power to the second shaft 28 through the splined connection between the cylinder block 38 and the second shaft 28.

When the first hydraulic unit 22 is operating in a displacing mode (e.g., the swashplate 70 is rotated so that it is not in the neutral position), rotation of the first shaft 26 by the engine 120 causes the rotating group 60 to turn with the first shaft 26 thereby converting mechanical power into hydraulic power in the form of high pressure fluid output through the high pressure line 30. This hydraulic power is transferred to the second hydraulic unit 24 through the high pressure line 30. The high pressure fluid output from the high pressure line 30 drives rotation of the rotating group 34 which is transferred to the second shaft 28 through the splined connection between the cylinder block 38 and the second shaft 28. In this way, hydraulic power is converted back to mechanical power that is output through the second shaft 28.

When the swashplate 70 of the first hydraulic unit 22 is in the neutral position in which rotation of the rotating group 60 does not generate displacement, the first and second shafts 26, 28 are effectively locked or mechanically locked and all power transferred from the first hydraulic unit 22 to the second hydraulic unit 24 is mechanical power that is transferred through the mechanical torque transfer arrangement 54. When the first and second shafts 26, 28 are locked, the second shaft 28 has a locked rotational speed that is set solely by the gear ratio of the mechanical torque transfer arrangement 54 and the speed of the first shaft 26 which corresponds to the input of the engine 120. The rotational speed of the second shaft 28 can be a forward rotational speed (e.g., clockwise rotational) speed. By pivoting the swashplate 70 in a positive direction from the neutral orientation to a forward angled position, the pistons 66 are caused to reciprocate within their respective cylinders 64 as the rotating group 60 rotates with the first shaft 26. This generates hydraulic pressure which is directed from the first hydraulic unit 22 through the high pressure line 30 to the rotating group 34 of the second hydraulic unit 24. This hydraulic power from the first hydraulic unit 22 drives the rotating group 34 to increase the rotational speed of the second shaft 28 in the forward direction as compared to the locked rotational speed. The greater the displacement of the first hydraulic unit 22 the greater the speed of the second shaft 28.

The swashplate 70 can also be pivoted in a negative direction from the neutral orientation to a reversed angled position in which the high and low pressure lines 30, 32 switch and the rotating group 60 pumps hydraulic fluid to the second hydraulic unit 24 in a direction which decreases the rotational speed of the second shaft 28 as compared to the locked rotational speed. If the displacement in the reverse direction is great enough, rotation of the second shaft 28 in the forward (e.g., clockwise) direction can be stopped or even reversed so as to cause the second shaft 28 to rotate in a counterclockwise direction. It will be appreciated that the second shaft 28 is driven in a clockwise direction when the first and second shafts 26, 28 are locked and when the swashplate 70 of the first hydraulic unit 22 is in a forward angled position.

Figure 12:
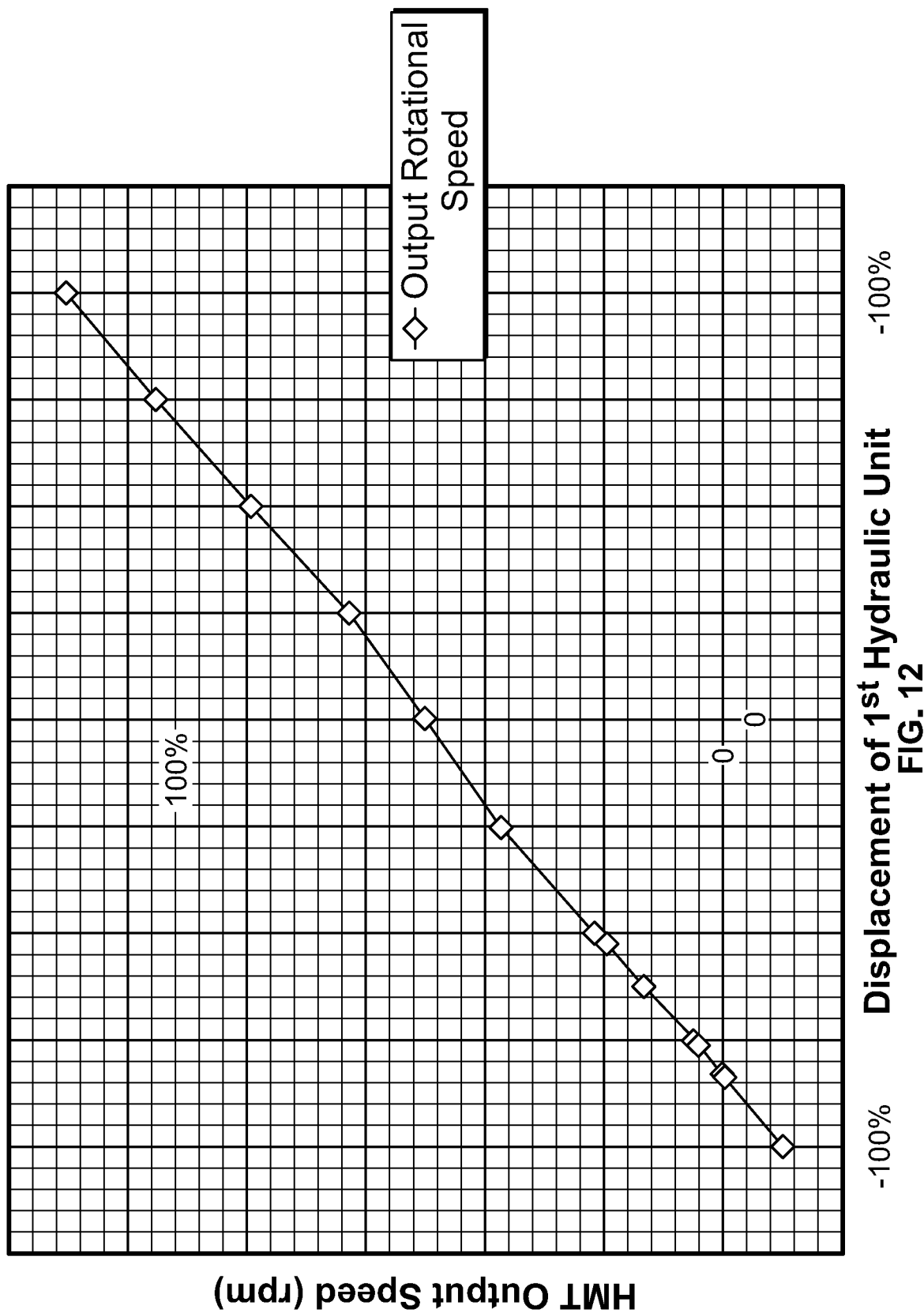
FIG. 12 is a graph showing the relationship between the rotational speed of the output shaft of the hydraulic mechanical transmission of FIG. 1 in relation to the hydraulic fluid flow rate between the hydraulic units of the mechanical hydraulic transmission of FIG. 1.

As shown at FIG. 12, when the displacement of the first hydraulic unit 22 is zero, the rotational speed of the second shaft 28 is just under 50% of the maximum rotational speed. By pumping hydraulic fluid from the first hydraulic unit 22 to the second hydraulic unit 24 in a first direction, the rotational speed of the second shaft 28 can be increased to a maximum forward rotational speed. In contrast, pumping hydraulic fluid in a reverse direction from the first hydraulic unit 22, the forward rotational speed of the second shaft 28 can be reduced. If the flow rate in the reverse direction is high enough, the second shaft 28 will stop rotating and even can be rotated slowly in a reverse direction.

In designing the hydraulic mechanical transmission 20, an input speed from the engine 120 is provided as a given or set value. A maximum rotational output speed and a minimum rotational output speed (which can be a reverse speed) are then identified. Next, the desired speed that will occur during a mechanical lock condition is determined. In one example, the mechanical lock speed may be half the sum of the maximum and minimum speeds. Then, the gear ratio is determined to establish the mechanical lock speed. In one example, the gear ratio is the ratio of the mechanical lock speed of the second shaft 28 to the input speed provided by the engine 120. In certain examples, the displacement ratio of the first hydraulic unit 22 to the second hydraulic unit 24 can be equal to the lock speed of the second shaft 28 divided by the maximum speed the output shaft subtracted by the lock speed of the output shaft. It will be appreciated that the torque output by the second shaft 28 is related to the speed of the second shaft 28. Generally, higher torque is provided by the second shaft 28 at lower speeds.

The various embodiments described above are provided by way of illustration only and should not be construed to limit the claims attached hereto. Those skilled in the art will readily recognize various modifications and changes that may be made without following the example embodiments illustrated and described herein, and without departing from the true spirit and scope of the following claims.

What is claimed is:

1. A hydraulic mechanical transmission comprising:
    a first hydraulic unit having a first shaft;
    a second hydraulic unit connected in hydraulic fluid communication with the first hydraulic unit by high and low pressure lines, the second hydraulic unit including a second shaft and a rotating group that is coupled to the second shaft so as to rotate in unison with the second shaft about an axis defined by the second shaft, the rotating group including a cylinder block that defines a plurality of axial cylinders, the rotating group also including pistons mounted to slide within the axial cylinders, the second hydraulic unit further including a rotatable component that is rotatable relative to the second shaft about the axis of the second shaft, the rotatable component including a swashplate that opposes ends of the pistons, the rotatable component also including a commutation structure for providing fluid communication between the high and low pressure lines and the axial cylinders of the rotating group while maintaining separation between the high and low pressure lines;
    at least one of the first and second hydraulic units having variable displacement;

a mechanical torque transfer arrangement for transferring torque between the first shaft and the rotatable component of the second hydraulic unit; and wherein in use one of the first and second hydraulic units operates as a hydraulic pump and the other of the first and second hydraulic units operates as a hydraulic motor.

2. The hydraulic mechanical transmission of claim 1, wherein the first hydraulic unit is a hydraulic pump.

3. The hydraulic mechanical transmission of claim 1, wherein the pistons reciprocate within the cylinders as the relative rotation occurs between the rotatable component and the rotating group about the axis of the second shaft, and wherein an angle of the swashplate relative to the axis of the second shaft determines a stroke length the pistons reciprocate within the cylinders as relative rotation occurs between the rotatable component and the rotating group about the axis of the second shaft.

4. The hydraulic mechanical transmission of claim 3, wherein the angle of the swashplate is fixed relative to the axis of the second shaft such that the second hydraulic unit has fixed displacement, and wherein the first hydraulic unit has variable displacement.

5. The hydraulic mechanical transmission of claim 3, wherein the ends of the pistons include shoes that travel along an arcuate path around the swashplate as relative rotation occurs between the rotatable component and the rotating group about the axis of the second shaft.

6. The hydraulic mechanical transmission of claim 5, wherein the commutation structure maintains fluid communication between the high pressure line and the rotating group regardless of a rotational position of the rotatable component about the axis defined by the second shaft, the commutation structure also maintaining fluid communication between the low pressure line and the rotating group regardless of a rotational position of the rotatable component about the axis defined by the second shaft, and wherein the commutation structure is adapted to rotate in unison with the swashplate relative to the second shaft such that in operation a rotational position of the commutation structure about the axis of the second shaft does not change relative to the swashplate.

7. The hydraulic mechanical transmission of claim 6, wherein the commutation structure includes a first annular groove in fluid communication with the high pressure line and a second annular groove in fluid communication with the low pressure line, wherein the commutation structure includes first porting in fluid communication with the first annular groove and second porting in fluid communication with the second annular groove, the first porting including a first fluid exchange interface in fluid communication with a first plurality of the cylinders of the rotating group as the rotating group rotates relative to the commutation structure, the second porting including a second fluid exchange interface in fluid communication with a second plurality of the cylinders of the rotating group as the rotating group rotates relative to the commutation structure, the first fluid exchange interface being fixed in rotational alignment with a first portion of the arcuate path around the swashplate, and wherein the second fluid exchange interface being fixed in rotational alignment with a second portion of the arcuate path around the swashplate.

8. The hydraulic mechanical transmission of claim 7, wherein the first portion of the arcuate path around the swashplate corresponds to an extension stoke of the pistons within the cylinder and the second portion of the arcuate path corresponds to a retraction stroke of the pistons within the cylinders.

9. The hydraulic mechanical transmission of claim 8, wherein the first and second fluid exchange interfaces each include a generally semi-circular slot.

10. The hydraulic mechanical transmission of claim 8, wherein the first and second annular grooves have open sides that face in an axial direction relative to the axis to the second shaft.

11. The hydraulic mechanical transmission of claim 8, wherein the first and second annular grooves have open sides that face in a radial direction relative to the axis to the second shaft.

12. The hydraulic mechanical transmission of claim 1, further comprising one or more bearings between the rotatable component and the second shaft for allowing relative rotation between the rotatable component and the second shaft about the axis of the second shaft.

13. The hydraulic mechanical transmission of claim 1, wherein the first hydraulic unit includes a rotating group coupled to the first shaft so as to rotate in unison with the first shaft, the rotating group including a cylinder block defining a plurality of cylinders and pistons adapted to slide in the cylinders, the first hydraulic unit further including a swashplate upon which shoes of the pistons ride, the swashplate being capable of being angled with respect to an axis of the first shaft with an angle of the swashplate determining a stroke length of the pistons within the cylinders, the angle of the swashplate being variable to vary the stroke length of the pistons and thus the displacement of the first hydraulic unit.

14. The hydraulic mechanical transmission of claim 13, wherein in use the first hydraulic unit is the hydraulic pump and the second hydraulic unit is the hydraulic motor, and wherein the hydraulic motor has a fixed displacement.

15. The hydraulic mechanical transmission of claim 14, wherein the swashplate of the hydraulic pump can be set at a neutral orientation perpendicular to the axis of the first shaft such that the hydraulic pump has zero displacement, wherein when the hydraulic pump has zero displacement the first and second shafts are locked with all power transferred from the hydraulic pump to the hydraulic motor being mechanical power through the mechanical torque transfer arrangement, and wherein the second shaft has a locked rotational speed when the first and second shafts are locked.

16. The hydraulic mechanical transmission of claim 15, wherein the swashplate can be pivoted in a positive direction from the neutral orientation to a forward angled position in which hydraulic fluid flow from the first hydraulic unit transfers hydraulic power from the first hydraulic unit to the second hydraulic unit which increases the rotational speed of the second shaft as compared to the locked rotational speed.

17. The hydraulic mechanical transmission of claim 16, wherein the swashplate can be pivoted in a negative direction from the neutral orientation to a reverse angled position in which hydraulic fluid flow from the first hydraulic unit transfers hydraulic power from the first hydraulic unit to the second hydraulic unit which decreases the rotational speed of the second shaft as compared to the locked rotational speed.

18. The hydraulic mechanical transmission of claim 17, wherein the high and low pressure lines reverse when the swashplates moves between the forward and reverse angled positions.

19. The hydraulic mechanical transmission of claim 1, wherein the mechanical torque transfer arrangement includes a component selected from the group consisting of a belt, a chain, a pulley and a gear.

20. The hydraulic mechanical transmission of claim 1, wherein the mechanical torque transfer arrangement includes a gear arrangement including intermeshing gears.

21. The hydraulic mechanical transmission of claim 20, wherein the gear arrangement includes only two intermeshing gears one corresponding to each of the first and second shafts.

22. The hydraulic mechanical transmission of claim 20, wherein the gear arrangement includes more than two gears.

23. The hydraulic mechanical transmission of claim 1, wherein the hydraulic mechanical transmission can be arranged in a U or Z shaped configuration.

24. The hydraulic mechanical transmission of claim 1, wherein the hydraulic mechanical transmission does not include a planetary gear set.

25. The hydraulic mechanical transmission of claim 1, wherein the first shaft is coupled to an engine and the second shaft is coupled to a drive train for transferring torque to a driven axle.

* * * * *